United States Patent [19]

Smith

[11] 3,945,286

[45] Mar. 23, 1976

[54] PORTABLE RADIAL ARM SAW

[76] Inventor: Roger W. Smith, 13120 Grandview Road, Grandview, Mo. 64030

[22] Filed: Nov. 8, 1974

[21] Appl. No.: 521,968

[52] U.S. Cl. .................. 83/486.1; 83/471.3; 83/574
[51] Int. Cl.² .......................................... B27B 5/20
[58] Field of Search............. 83/486.1, 471.3, 471.2, 83/455, 574

[56] References Cited
UNITED STATES PATENTS

| | | | |
|---|---|---|---|
| 1,522,604 | 1/1925 | Torlinski | 83/486.1 |
| 1,865,759 | 7/1932 | Hughes | 83/574 |
| 2,489,420 | 11/1949 | Kirk et al. | 83/486.1 |
| 2,835,285 | 5/1958 | Gardner | 83/486.1 |
| 2,987,083 | 6/1961 | Ross et al. | 83/574 |

Primary Examiner—Donald R. Schran
Attorney, Agent, or Firm—D. A. N. Chase

[57] ABSTRACT

A radial arm saw features light weight, portability and simplicity of construction. A standard supports a one-piece radial arm that comprises a pair of horizontal, vertically spaced cantilever rails rigidly joined at their outer ends by an integral connecting member. A sliding runner spans the rails and has vertically spaced bearing parts receiving corresponding rails. A vertical spindle on the runner is connected at its lower end to the top of a cage that receives a conventional portable circular saw, thereby suspending the saw unit beneath the rails and above the work surface. The spindle permits the cage to be rotated for either cross-cut or ripping operations, and the radial arm is adjustable in a horizontal plane by a special detent arrangement on the standard that allows the elevation of the saw unit to be varied in any selected radial position.

13 Claims, 10 Drawing Figures

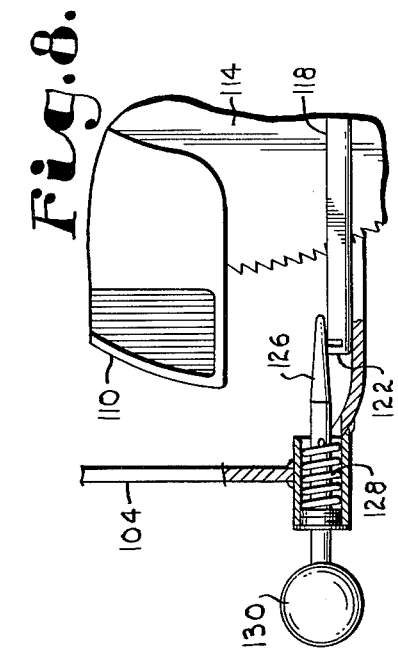
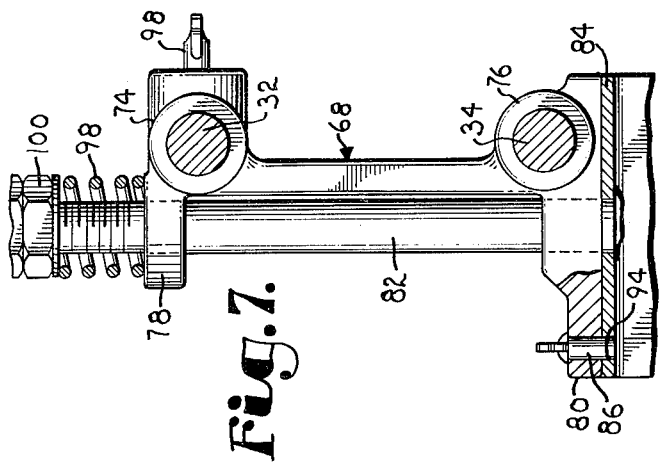
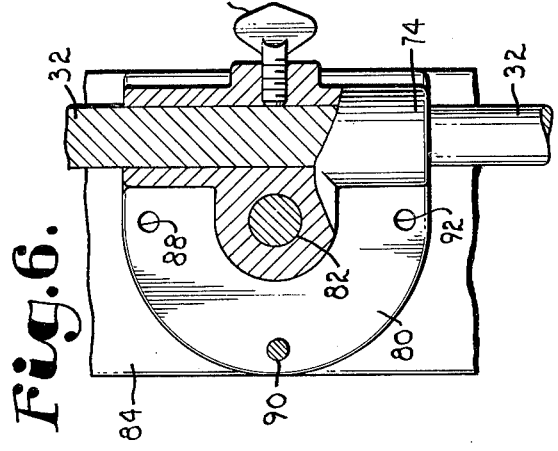
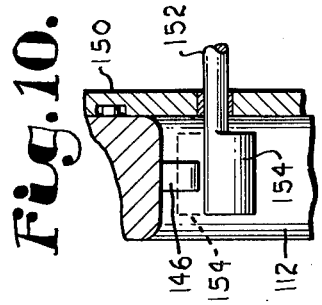
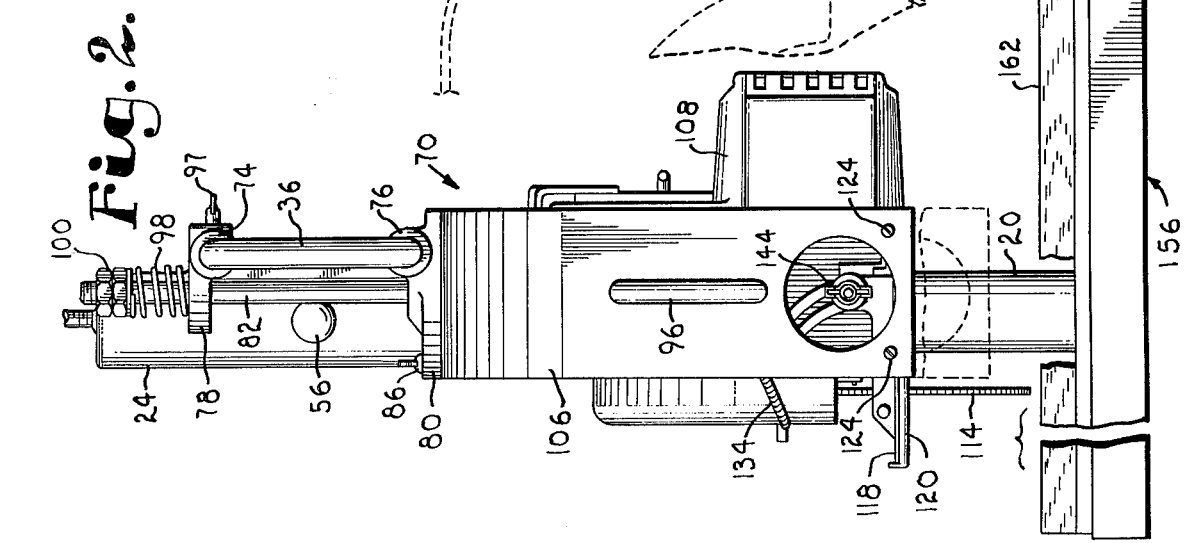

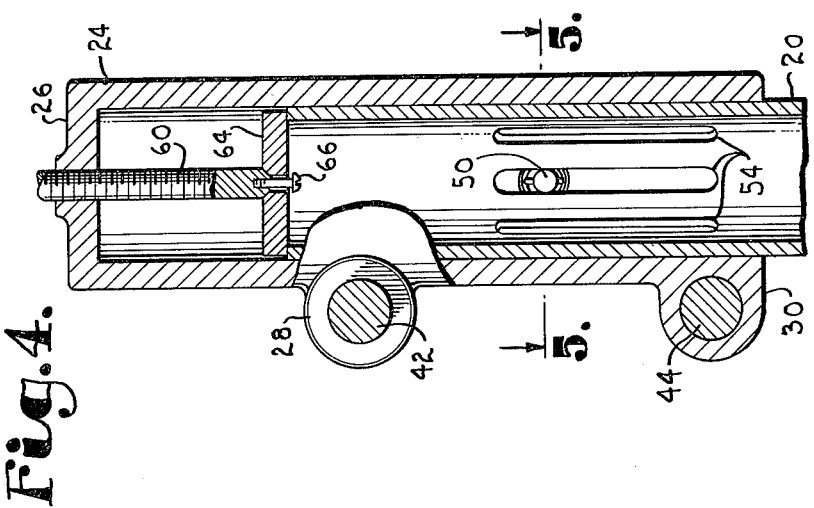
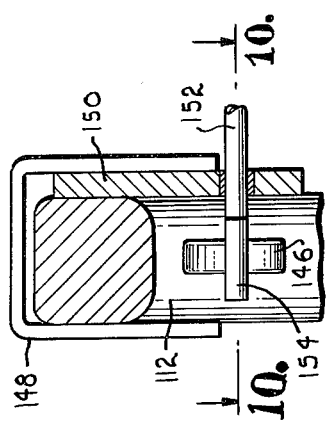
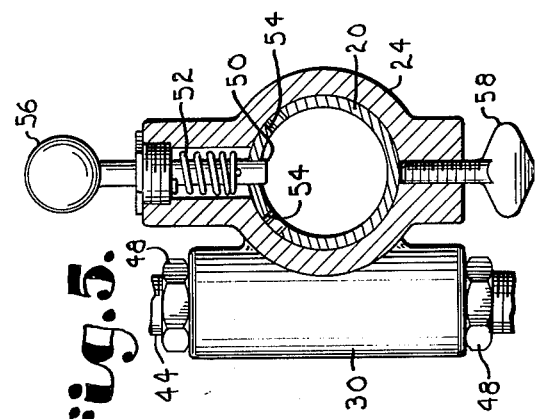
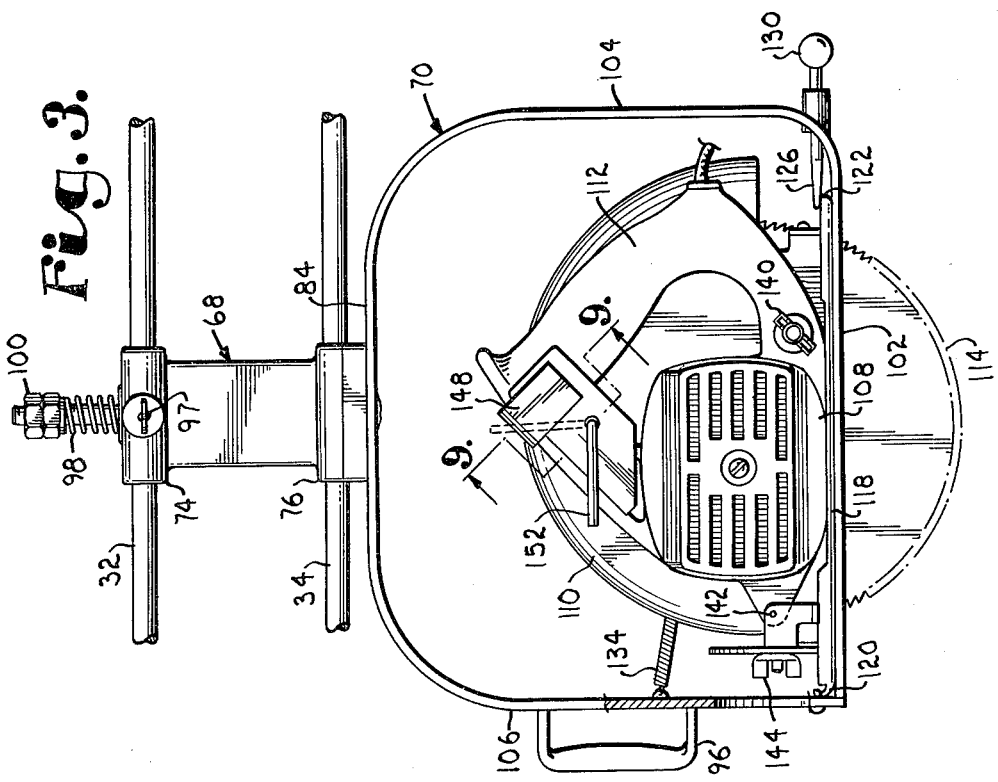

PORTABLE RADIAL ARM SAW

This invention relates to a radial arm saw which is portable and relatively uncomplex mechanically without sacrificing versatility of operation and the ruggedness required of saws of this type.

The radial arm saw is a standard shop tool that is useful in a wide variety of applications, but it is not inherently portable nor inexpensive. Though desirable, commercially available saws of this type have a cost beyond the reach of many hobbyists and do-it-yourself enthusiasts. Much of the mechanical complexity is in the construction of the radial arm and the reciprocal carriage that contains the cutting blade and drive. Furthermore, the inherent weight normally associated with conventional radial arm saws is due to the radial arm construction and the amount that it requires.

It is, therefore, the primary object of the present invention to provide a radial arm saw which overcomes the disadvantages heretofore considered inherent in saws of this type, and to thereby provide a saw of simplified construction which renders the saw apparatus lightweight and portable.

As a corollary to the foregoing object, it is an important aim of this invention to provide a saw as aforesaid which overcomes the mentioned disadvantages without sacrificing versatility of operation or structural strength of the components of the mechanism.

Still another important object of the invention is to provide a saw as aforesaid wherein the construction of the radial arm is materially simplified and a substantial weight reduction is realized, thereby contributing significantly to the portability of the overall assembly and a reduction in its cost.

Yet another important object of the invention is to provide a saw as aforesaid wherein the radial arm is of one-piece construction and presents a pair of horizontally extending, cantilever rails spaced apart in a vertical plane, the outer ends of the rails being spanned by an integral connecting member that maintains the ends fixed relative to each other.

Additionally, it is an important object of the invention to provide a means of suspending the cutting unit beneath the aforesaid rails, wherein such means employs a runner spanning the rails and having bearing parts receiving corresponding rails for sliding movement of the runner therealong, the bearing parts being rigidly supported in vertically spaced relationship so that the weight of the suspended cutting unit is supported by both rails held in a fixed spaced relationship.

Furthermore, it is an important object of the invention to provide a special mount for the suspended cutting unit, in the form of a cage particularly adapted to receive a conventional portable circular saw utilized as the power driven cutting unit.

Other important objectives are to provide selectivity as to crosscut or ripping operations, adjustability of the angular position of the radial arm in a horizontal plane, and a simple height control for varying the elevation of the radial arm and hence the elevation of the cutting unit with respect to the work surface.

In the drawings:

FIG. 2 is a fragmentary, end view of the apparatus shown in FIG. 1, the ripping position being indicated in broken lines;

FIG. 3 is a side elevational view of the runner, cage and saw unit from the side opposite that seen in FIG. 1;

FIG. 4 is an enlarged, fragmentary, vertical sectional view taken along line 4—4 of FIG. 1;

FIG. 5 is a cross-sectional view taken along line 5—5 of FIG. 4, the detent being shown in plan for clarity;

FIG. 6 is a view of the runner casting from which the cage is suspended, showing the same partially in plan and partially in horizontal section and on the same scale as FIGS. 4 and 5;

FIG. 7 is a vertical sectional view taken along line 7—7 of FIG. 1 and on the same scale as FIGS. 4–6, the spindle and certain other components being shown in elevation for clarity;

FIG. 8 is a detail view of the releasable saw lock;

FIG. 9 is an enlarged, fragmentary, cross-sectional view taken along line 9—9 of FIG. 3; and FIG. 10 is a fragmentary, cross-sectional view along line 10—10 of FIG. 9.

Figure 1:
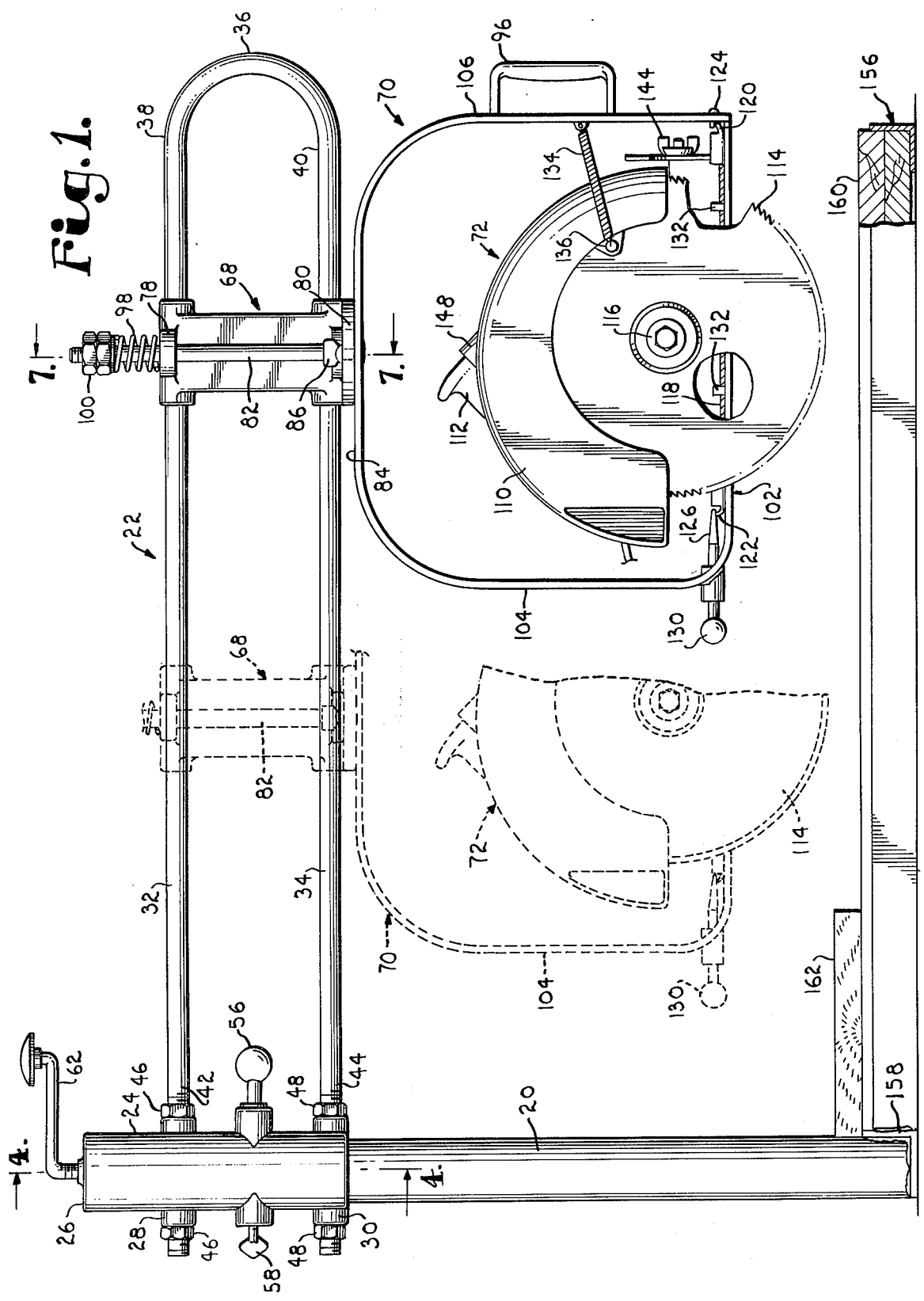
FIG. 1 is a side elevational view of the saw apparatus of the present invention, movement of the power driven saw unit and its supporting cage along the radial arm being indicated by the broken line illustration.

Referring initially to FIG. 1, the saw apparatus includes a tubular standard or post 20 which supports a radial arm broadly denoted 22. A relatively short tubular component 24 having a closed upper end 26 is telescoped over the upper portion of the standard 20 and is formed with a pair of upper and lower bosses 28 and 30 respectively. The radial arm 22 is of one-piece construction and, as viewed in FIG. 1, has an appearance resembling the slide of a slide trombone. The arm 22 may be formed from cold rolled steel, either solid or tubular stock.

By virtue of its configuration and construction, the arm 22 presents a pair of upper and lower cantilever rails 32 and 34 respectively which extend horizontally in parallelism from the standard 20. As may be appreciated from a comparison of FIGS. 1 and 2, the rails 32 and 34 lie in a common vertical plane as does the integral connecting member 36 that spans the outer ends 38 and 40 of the rails 32 and 34 respectively. The member 36 is longitudinally arcuate and extends outwardly beyond the rail ends 38 and 40. Representative spacing between the parallel rails 32 and 34 would be approximately three inches (7.6 cm.) for a total arm length of 24 inches (61 cm.).

Referring to FIGS. 1, 4 and 5, it may be seen that the inner ends 42 and 44 of the respective rails 32 and 34 are externally threaded and secured to the tubular component 24 at the bosses 28 and 30. The bosses extend horizontally and are bored to receive the ends 42 and 44, which are then firmly secured by pairs of nuts 46 and 48 on the respective ends 42 and 44 engaging opposite ends of the horizontal bosses 28 and 30. The component 24 is coaxial with the standard 20 but is prevented from rotating thereon by a detent 50 which is biased by a spring 52 into any one of three vertical slots 54 in the standard 20. The slots 54 are angularly spaced about the vertical axis of the standard 20, the center slot 54 establishing the normal position of the radial arm 22 for regular crosscut operations (as shown). An integral knob 56 on the detent 50 permits the same to be manually shifted against the bias of the spring 52 so that the arm 22 may be swung in a horizontal plane to a 45° position either left or right of center established by the two outer slots 54. Intermediate positions may also be selected by withdrawing the detent 50 and locking the component 24 to the standard 20 through the use of a set screw 58 provided for this purpose.

Variation of the elevation of the radial arm 22 is accomplished by a vertical screw 60 threaded through the upper end 26 of the component 24 in coaxial relationship with such component and the standard 20. A crank handle 62 (FIG. 1) on the upper end of the screw 60 permits the operator to readily rotate the screw in either direction to raise or lower the component 24 on the standard 20. As may be seen in FIG. 4, this is accomplished by the lower end of the screw 60 in that it bears against a center recess in a disc 64 overlying the upper end of the standard 20. A small screw 66 is loosely received in a central opening through the disc 64 and is threaded into the lower end of the elevating screw 60 in order to serve as a retainer to prevent separation of the disc 64 from the screw 60 (and possible loss of the disc 64) upon disassembly of the standard 20 and component 24.

Now referring particularly to FIGS. 1–3, 6 and 7, the cutting assembly of the present invention includes a runner 68 which rides on the rails 32 and 34 and suspends a carrier 70 therebeneath, such carrier being in the nature of a cage that serves as a mount for a conventional portable circular saw unit 72. The runner 68 is a casting of vertically elongated configuration that spans the rails 32 and 34 and is provided with upper and lower sleeve bearings 74 and 76 respectively receiving corresponding rails 32 and 34. A lug 78 projects laterally from the top of the runner 68 and a flange 80 likewise projects from the bottom thereof, the lug and flange being bored to receive a vertical spindle 82 which is welded to the top 84 of the cage 70 at its lower end. A locking pin 86 extends through any one of three holes 88, 90 and 92 in the flange 80 and is received by an opening 94 in the cage top 84. The holes 88, 90 and 92 are spaced apart at angular intervals of 45° about the axis of the spindle 82, the hole 90 when aligned with the opening 94 (as illustrated) defining the position of the cage 70 for crosscut operations. The locking pin 86 may be removed and the cage 70 rotated until the opening 94 is aligned with either hole 88 and 92 and the locking pin reinserted, either of these latter positions being used for ripping. The broken line illustration in FIG. 2 corresponds to alignment of hole 88 with opening 94 which places the handle 96 on the right side as viewed in FIG. 2. A set screw 97 is threaded into the upper sleeve bearing 74 and is used to hold the runner 68 stationary on the radial arm 22 during ripping operations.

The top 84 of the cage 70 is held in flush engagement with the horizontal bottom surface presented by the flange 80 by a coil spring 98 telescoped over the upper end portion of the spindle 82. The spring 98 is loaded in compression between the lug 78 and a pair of nuts 100 threaded on the upper end of the spindle 82.

The cage 70 as illustrated is made from a strip of metal plate stock formed into a closed, generally rectangular frame configuration. The ends of the strip join at the lower righthand corner of the cage 70 as viewed in FIG. 1, and are welded at that point. The top 84 is flat, as is the bottom 102, and both extend horizontally in parallelism except for the three rounded corners. Likewise, the opposed side members 104 and 106 are disposed in parallelism but at right angles to the top 84 and bottom 102, the handle 96 being secured to the member 106. It may be appreciated that the cage 70 circumscribes the saw unit 72 with its bottom 102 serving as a mounting base for the unit as will now be described in detail.

The saw unit 72 has a frame consisting of a motor housing 108, a fixed blade guard 110 and a handle 112 as basic components. A rotary blade 114 is attached to the driven shaft 116 of the motor drive, the electric motor itself and the gear drive to the shaft 116 not being illustrated herein in detail. The particular unit 72 shown is a model 574, 7¼ inch power saw manufactured by Skil Corporation of Chicago, Ill., and sold under the trademark SKILSAW. The unit 72 has a baseplate 118 of rectangular configuration which presents a pair of opposed end edges 120 and 122. The baseplate 118 directly overlies the bottom 102 of the cage 70, with the edge 120 being inserted under a pair of screws 124 in the side member 106 which project into the cage 70. The opposite edge 122 (see FIG. 8) is captured beneath a locking catch 126 which is biased toward the locked position illustrated by a coil spring 128. A knob 130 on the outer end of the stem of the catch 126 provides a convenient means whereby the catch may be withdrawn against the bias of the spring 128 to disengage the inner end of the catch 126 from the edge 122, thereby releasing the saw unit 72 from the cage mount. The unit 72 is further stabilized by a pair of upstanding pins 132 on the cage bottom 102 which are received within openings in the baseplate 118. In the particular unit illustrated, such openings in baseplate 118 exist in the unit as manufactured and thus are employed in the present invention in conjunction with the appropriately positioned pins 132. It will be appreciated that other circular saw units may also be employed and, in that case, the pins 132 would be relocated as necessary. A counterspring 134 is attached to a stud 136 on the movable blade guard of the unit 72 to maintain the movable guard in a raised position (hidden from view in FIG. 1) where it does not interfere with the portion of the blade 114 projecting below the baseplate 118.

Circular saws such as illustrated at 72 provide for vertical adjustability of the rotary blade 114 as may be seen in FIG. 3. This adjustment is accomplished by loosening the wing nut 140 on the handle 112 to permit the frame of the saw unit to pivot about the axis of a hinge pin 142. Similarly, tilting of the saw blade 114 relative to the plane of the baseplate 118 is accomplished by loosening a wing nut 144 so that the frame of the unit can pivot about a horizontal axis provided in the unit which extends in parallelism with the baseplate 118 longitudinally thereof (parallel to the radial arm 22 when the cage 70 is in the crosscut position illustrated in FIGS. 1 and 3 and in FIG. 2 in full lines).

The electric motor within the housing 108 is activated by a trigger 146 which, when depressed, closes an internal electric switch (not shown). For the convenience of the operator since handle 96, not the handle 112 of the saw unit 72, is used in the operation of the saw apparatus of the present invention, means is provided to hold the trigger depressed to maintain the motor energized. This is illustrated in FIGS. 9 and 10 where it may be seen that a U-shaped clasp 148 holds a plate 150 against one side of the handle 112 adjacent the trigger 146, the plate 150 serving as a mount for a rotatable crank 152. The shaft of the crank 152 extends through the plate 150 and into the hollow of the handle 112 where the trigger 146 is located, the inner end of such shaft being provided with an eccentric cam 154 which engages the trigger 146 and depresses the same when the crank 152 is rotated to the broken line position thereof illustrated in FIGS. 3 and 10. Due to the interference between the cam 154 and the trigger 146 created by the internal return spring (not shown) of the trigger 146, the cam 154 remains in the actuated position to hold the trigger depressed until the crank 152 is returned by the operator to the position illustrated in full lines.

In FIG. 1, it may be seen that a table base structure for the saw apparatus comprises an angle iron frame 156 to which the lower end of the standard 20 is welded at the center of the inner frame member 158. The frame 156 is preferably square and holds two square pieces of particle board 160 stacked one on top of the other within the frame 156. Each piece of particle board 160 may be turned 90° four times and inverted; accordingly, 16 surfaces are effectively provided to compensate for wear in normal use. A stop block 162 is secured to the work surface by any suitable means adjacent the base of the standard 20 and extends along the inner margin of the surface to provide a guide for the work piece (not shown).

In the utilization of the present invention, it is evident that the saw apparatus may be disassembled into its major components for convenient portability, or transported as an assembled unit. At such time, the circular saw 72 would normally be removed from the cage 70 for conventional use as a portable hand saw. It may be appreciated that the circular saw is very quickly returned to the cage 70 by withdrawing the locking catch 126, placing the baseplate 118 on the cage bottom 102 in proper position on the pins 132 with the end edge 120 inserted beneath the retaining projections provided by the screws 124, and then releasing the catch 126 to engage the same with the end edge 122 and lock the baseplate 118 to the bottom 102.

The work piece is placed on the supporting surface provided by the stacked pieces of particle board 160 against the stop block 162 and cutting operations proceed in the usual manner for saws of the radial arm type. For crosscut operation, which is the mode illustrated in FIG. 1, the operator grasps the handle 96 on the cage 70 and advances the blade 114 as desired along the path defined by the rails 32 and 34. The angular position of the radial arm 22 (rails 32 and 34) in a horizontal plane is quickly and conveniently set by withdrawing the knob 56 of the detent 50 and rotating the arm to the desired position. At 45° left or right of center, the detent 50 snaps into the respective outer slot 54 (FIGS. 4 and 5); the set screw 58 is employed for other angles.

At the primary angular positions defined by the three slots 54, the radial arm 22 remains locked in place during height adjustments. This feature is provided by the vertical elongation of the slots 54 in cooperation with the detent 50 which rides in the respective slot as the screw 60 is rotated in either direction by the crank handle 62. The slots 54, therefore, define a wide range of elevation adjustment to facilitate different diameters of the saw blade 114 or different saw units 72 that might be employed.

For ripping operations, as mentioned above, the spindle 82 permits rotation of the cage 70 as illustrated in broken lines in FIG. 2. The locking pin 86 is momentarily removed from the hole 90 and reinserted through either hole 88 or 92 and the underlying opening 94 in the cage top 84. The set screw 97 holds the runner 68 and cage 70 at the desired position along radial arm 22, and the work piece is advanced through the blade 114.

It should be particularly noted that the radial arm 22, although cantilever supported and of lightweight construction, remains stable and does not bend or deflect when the cage 70 is adjacent its outboard end as illustrated in full lines in FIG. 1. The stability imparted is due to several factors including the one-piece construction of the radial arm and the location of the spaced rails 32 and 34 in a common vertical plane. The connecting member 36, being integral with the rails 32 and 34, is rigidly joined to the outer ends 38 and 40 of the rails and maintains such ends fixed relative to each other. This further contributes to the stability of the radial arm since the vertical spacing of the rails 32 and 34 is fixed at both the inner and outer ends; accordingly, for the upper rail 32 to be placed in tension, the lower rail 34 must be placed in compression and the rails thus resist any tendency to bend or deflect. Additionally, the upper and lower sleeve bearings 74 and 76 on the runner 68 are rigidly supported by the runner casting in fixed spaced relationship aligned with and receiving the corresponding rails. This maintains the rail spacing at the runner 68 at intermediate positions thereof along the length of the radial arm as illustrated, for example, by broken lines in FIG. 1.

Having thus described the invention, what is claimed as new and desired to be secured by Letters Patent is:

1. Radial arm saw apparatus comprising: a work-supporting surface;

an upright support adjacent said surface;

a pair of vertically spaced, upper and lower cantilever rails fixed to said support, extending generally horizontally therefrom above said surface, and each presenting an outer end remote from said support, said rails lying in a common vertical plane;

a connecting member spanning the outer ends of said rails, rigidly joined to said ends and maintaining the same fixed relative to each other;

a power-driven saw unit;

a carrier beneath said lower rail receiving said unit and mounting the same in an operational position; and means on said rails movable therealong and suspending said carrier therebeneath, whereby the carrier and hence the saw unit can be advanced along a path defined by said rails to make a cut in a workpiece positioned on said surface.

2. The apparatus as claimed in claim 1, wherein the outer ends of said rails are in substantial vertical alignment, and wherein said connecting member lies in said plane.

3. The apparatus as claimed in claim 1, wherein said rails and connecting member present a radial arm of onepiece, unitary construction.

4. The apparatus as claimed in claim 3, wherein the outer ends of said rails are in substantial vertical alignment, and wherein said connecting member lies in said plane.

5. The apparatus as claimed in claim 4, wherein said rails are in parallelism, and wherein said connecting member is elongated and longitudinally arcuate and extends outwardly beyond said outer ends.

6. The apparatus as claimed in claim 1, wherein said rails are in parallelism, and wherein said movable means includes a runner spanning said rails and having vertically spaced, upper and lower bearing parts receiving corresponding rails for sliding movement of the runner therealong.

7. The apparatus as claimed in claim 6, wherein said runner has structure between the rails rigidly supporting said bearing parts in spaced relationship aligned with corresponding rails.

8. The apparatus as claimed in claim 6, wherein said movable means further includes a vertical spindle on said runner having a lower end secured to said carrier to suspend the latter beneath the rails, said spindle establishing a vertical axis for rotation of said carrier about said axis to a selected position for crosscut or ripping operations, and means releasably locking the carrier to the runner in the selected position.

9. The appartus as claimed in claim 8, wherein said saw unit has a rotary blade, and wherein said carrier comprises a cage circumscribing said unit and having a bottom supporting the unit with said blade projecting below said bottom toward said surface, and a top to which said lower end of the spindle is secured.

10. The apparatus as claimed in claim 1, wherein said saw unit has a baseplate and a rotary blade projecting through said baseplate, and wherein said carrier comprises a cage circumscribing said unit and having a bottom receiving said baseplate thereupon and a top secured to said movable means, and means releasably locking said baseplate to said bottom.

11. The apparatus as claimed in claim 10, wherein said cage has a side member provided with a handle to facilitate advancement of the cage in making a cut.

12. The apparatus as claimed in claim 1, wherein said support includes a standard and a tubular component telescoped thereon, said rails having inner ends secured to said component, said standard presenting a vertical axis and having vertically extending slots therein angularly spaced with respect to said axis, said component being provided with detent means selectively receivable in individual slots upon rotation of said component about said axis to permit the rails to be releasably held in a selected angular position in a horizontal plane, and wherein is provided means for raising and lowering said component on said standard whereby, over a range permitted by said slots, the elevation of the saw unit may be varied with said detent means engaged.

13. The apparatus as claimed in claim 1, wherein said support includes a standard and a coaxial, tubular component telescoped thereon having a closed upper end, said rails having inner ends secured to said component, and wherein is provided screw means extending axially of said standard and component and threaded through said upper end of the component for raising and lowering the latter on said standard to vary the elevation of the saw unit.

* * * * *